(12) United States Patent
Haka

(10) Patent No.: US 6,976,933 B2
(45) Date of Patent: Dec. 20, 2005

(54) MULTI-SPEED POWER TRANSMISSION

(75) Inventor: Raymond J. Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/786,639

(22) Filed: Feb. 25, 2004

(65) Prior Publication Data

US 2005/0187064 A1 Aug. 25, 2005

(51) Int. Cl.$^7$ ............................................. F16H 3/44
(52) U.S. Cl. .................... 475/296; 475/284; 475/303; 475/314; 475/326; 192/48.91; 192/53.34
(58) Field of Search ................................. 475/284, 296, 475/303, 314, 326; 192/48.91, 53.34

(56) References Cited

U.S. PATENT DOCUMENTS

| | | | |
|---|---|---|---|
| 2,560,886 A | * | 7/1951 | Orr .............................. 475/296 |
| 2,658,413 A | * | 11/1953 | Orr et al. ....................... 477/60 |
| 4,531,428 A | * | 7/1985 | Windish ....................... 475/279 |
| 4,721,194 A | * | 1/1988 | Frost ......................... 195/48.91 |
| 5,975,263 A | * | 11/1999 | Forsyth .................... 192/53.32 |
| 6,267,215 B1 | * | 7/2001 | Bader et al. .............. 192/53.34 |
| 6,746,360 B2 | * | 6/2004 | Bucknor et al. ............ 475/296 |
| 6,811,010 B1 | * | 11/2004 | Armstrong ................ 192/48.91 |
| 2004/0097324 A1 | * | 5/2004 | Ziemer ........................ 475/296 |

FOREIGN PATENT DOCUMENTS

WO    WO 2079670 A2 * 10/2002    ............. F16H 3/66

* cited by examiner

Primary Examiner—Rodney H. Bonck
Assistant Examiner—David D. Le
(74) Attorney, Agent, or Firm—Christopher DeVries

(57) ABSTRACT

A powertrain includes a planetary gear arrangement, an engine, an input clutch, an input shaft, and an output shaft. The planetary gear arrangement includes a simple planetary gearset and a compound planetary gearset, each of which has connected therewith three synchronizer mechanisms. The synchronizer mechanisms are manipulated in various combinations to establish ten forward speed ratios and one reverse speed ratio between the input shaft and the output shaft.

3 Claims, 2 Drawing Sheets

| Gear | Ratio | Synchronizer | | | | | | |
|------|-------|----|----|----|----|----|----|----|
|      |       | 46 | 48 | 50 | 52 | 54 | 56 |
| Rev  | -3.71 | C1 | R1 | S2 | C2 | R2 | S1 |
| 1st  | 3.31  | S1 | R1 | R2 | S2 | C2 | C1 |
| 2nd  | 2.71  | C1 | R1 | R2 | S2 | C2 | S1 |
| 3rd  | 2.22  | S1 | R1 | R2 | OPEN | R2 | C1 |
| 4th  | 1.82  | C1 | R1 | R2 | OPEN | R2 | S1 |
| 5th  | 1.49  | R1 | R1 | R2 | S2 | C2 | S1 |
| 6th  | 1.22  | C1 | C1 | C2 | OPEN | R2 | S1 |
| 7th  | 1.00  | R1 | R1 | R2 | S2 | R2 | S1 |
| 8th  | .82   | R1 | C1 | C2 | S2 | C2 | S1 |
| 9th  | .67   | R1 | R1 | R2 | OPEN | R2 | S1 |
| 10th | .50   | R1 | C1 | R2 | OPEN | R2 | S1 |

S1 = Sun Gear 24  S2 = Sun Gear 36   OPEN = NEUTRAL
R1 = Ring Gear 26  R2 = Ring Gear 38  R1/S1 = 2.22
C1 = Carrier 34   C2 = Carrier 44    R2/S2 = 2.04

*FIG. 2*

MULTI-SPEED POWER TRANSMISSION

TECHNICAL FIELD

This invention relates to power transmissions and, more particularly, to power transmissions employing a plurality of mechanical clutches and planetary gearing.

BACKGROUND OF THE INVENTION

Multi-speed power transmissions, which employ mechanical clutches such as synchronizers, generally include pairs of meshing external gears to establish drive or speed ratios between a transmission input shaft and a transmission output shaft. These transmissions require a pair of meshing gears for each of the forward speed ratios, other than direct, and one and a half pair of gears for the reverse speed ratio.

Each of the gear pairs includes a synchronizer or mechanical clutch, which engages one of the gears with either the main shaft or a countershaft, while the other gear of that mesh is continuously driven by one of the other shafts. The synchronizers are generally two-way synchronizers such that each synchronizer clutch has a shift collar and an output member,. which can be connected with the shift collar individually. The synchronizers are then placed or situated between two of the gear pairs on a given shaft such that a single synchronizer having two output sides can control two gear meshes.

For example, a ten-speed transmission having a single reverse speed would require ten and a half pairs of gears, assuming one of the ratios is direct, and five and one-half synchronizers. The reverse ratio normally would include the input gear for first gear, an idler gear, and a separate output gear. Thus, the reverse ratio is relatively close in numerical value to the first ratio.

SUMMARY OF THE INVENTION

The present invention provides a planetary gear arrangement using two planetary gearsets and six mechanical clutches or synchronizers to obtain twelve forward speed ratios and four reverse speed ratios. Of the twelve forward speeds, ten of these provide a useable progression for an automotive transmission. Also, of the four reverse speeds, only one or two of these are practical for automotive use. A typical countershaft arrangement would require ten and a half pairs of external gears as mentioned above. With the present invention, one of the planetary gearsets is a compound planetary gearset while the other is a simple planetary gearset.

It is therefore an object of this invention to provide an improved manual transmission employing planetary gearsets.

In one aspect of the present invention, one of the planetary gearsets is a compound planetary gearset and the other of the planetary gearsets is a simple planetary gearset.

In another aspect of the present invention, six synchronizer clutches are employed to establish ten forward speed ratios and one reverse speed ratio between a transmission input shaft and a transmission output shaft.

In still another aspect of the present invention, two of the synchronizer clutches are three-way synchronizer mechanisms and four of the synchronizer clutches are two-way synchronizer mechanisms.

In a further aspect of the present invention, a sun gear member, a planet carrier member, and a ring gear member can each be connected with a transmission input shaft through one of the three-way synchronizer mechanisms.

In yet a further aspect of the present invention, the ring gear member, sun gear member, and planet carrier member of the simple planetary gearset are each connectible with two members of the compound planetary gearset through one of the two-way synchronizer mechanisms and a three-way synchronizer mechanism.

In a yet further aspect of the present invention, two of the members of the compound planetary gearset can be connected with a ground member through one of the two-way synchronizer mechanisms and two of the members of the simple planetary gearsets can be connected with a ground member to one of the two-way synchronizer mechanisms.

In a still further aspect of the present invention, two of the members of the simple planetary gearset are connectible with the transmission output shaft through another of the two-way synchronizer mechanisms.

DESCRIPTION OF THE DRAWINGS

FIG. 2 is a chart describing the engagement of the synchronizer mechanisms to establish a reverse speed ratio and ten forward speed ratios in the planetary transmission shown in FIG. 1.

DESCRIPTION OF AN EXEMPLARY EMBODIMENT

Figure 1:
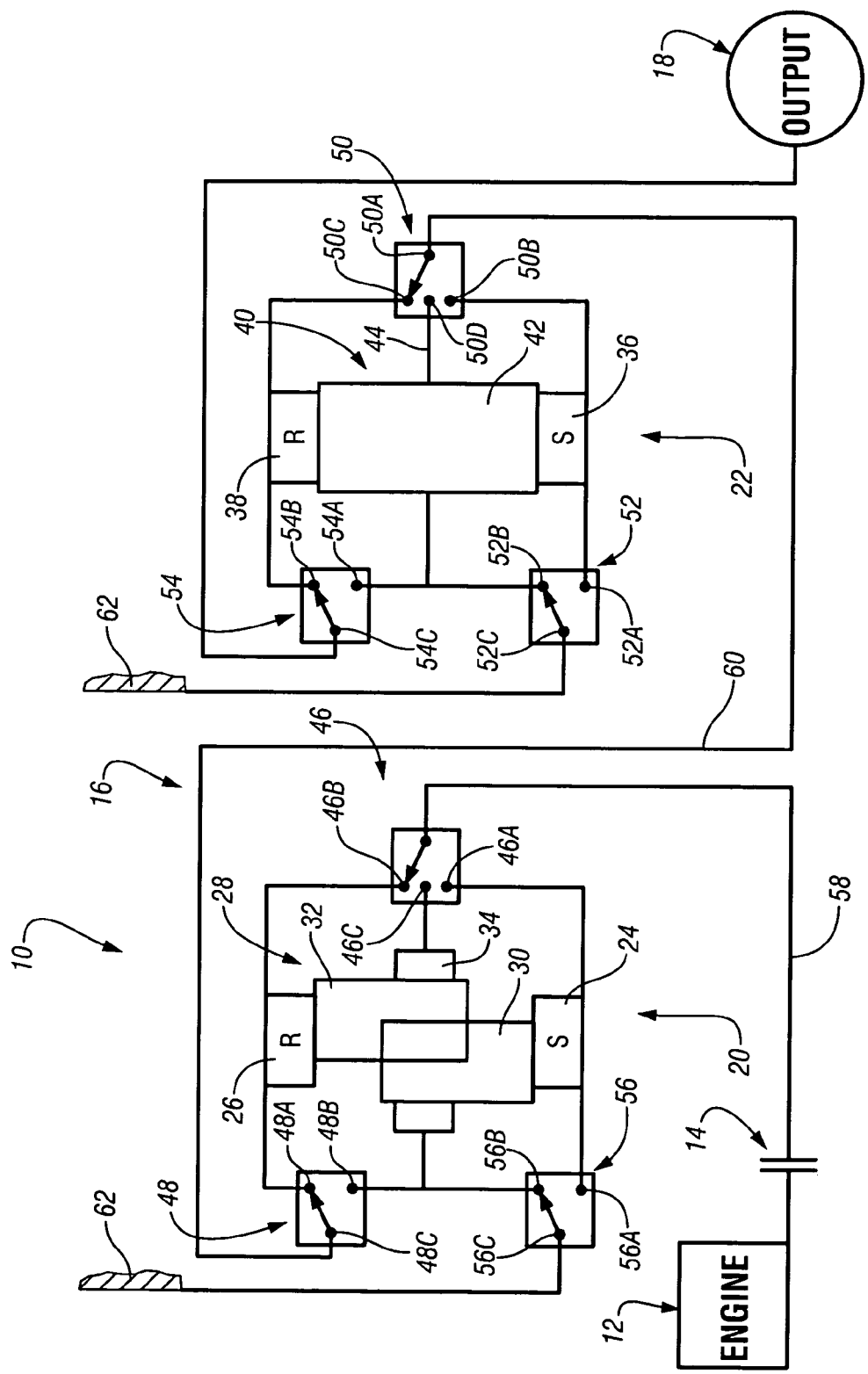
FIG. 1 is a schematic representation of a planetary transmission employing the present invention.

Referring to the drawings, there is seen in FIG. 1 a powertrain 10 having a conventional internal combustion engine 12, an input clutch 14, a planetary gear arrangement 16, and an output shaft 18. The planetary gear arrangement 16 includes two planetary gearsets 20 and 22.

The planetary gearset 20 is a compound planetary gearset having a sun gear member 24, a ring gear member 26, and a planet carrier assembly member 28. The planet carrier assembly member 28 has pairs of meshing gears 30 and 32 that are rotatably mounted on a planet carrier member 34.

The planetary gearset 22 is a simple planetary gearset having a sun gear member 36, a ring gear member 38, and a planet carrier assembly member 40. The planet carrier assembly member 40 includes a plurality of pinion gear members 42 that are rotatably mounted on a planet carrier member 44 and disposed in meshing relationship with both the sun gear member 36 and the ring gear member 38.

The planetary gear arrangement 16 also includes six mechanical clutches or torque-transmitting mechanism synchronizer mechanisms 46, 48, 50, 52, 54, and 56. The synchronizer mechanisms 46 and 50 are conventional three-way synchronizer mechanisms while the synchronizer mechanisms 48, 52, 54, and 56 are conventional two-way synchronizer mechanisms.

The synchronizer mechanism 46 is connected between a transmission input shaft 58 and the compound planetary gearset 20. The input shaft 58 is continuously connected with the input clutch 14 such that when the clutch 14 is engaged, the input shaft 58 is driven by the engine 12. The synchronizer mechanism 46 has three output members 46A, 46B, and 46C. The output member 46A is continuously connected with the sun gear member 24, the output member 46B is continuously connected with the ring gear member 26, and the output member 46C is continuously connected with the planet carrier member 34.

The synchronizer mechanism 48 has two input members 48A and 48B and one output member 48C. The input member 48A is continuously connected with the ring gear member 26, and the input member 48B is continuously connected with the planet carrier member 34. The output member 48C is connected with a hub and shaft assembly 60, which is drivingly connected with an input member 50A of the synchronizer mechanism 50.

The synchronizer mechanism 50 has three output members 50B, 50C, and 50D. The output member 50B is continuously connected with the sun gear member 36, the output member 50C is continuously connected with the ring gear member 38, and the output member 50D is continuously connected with the planet carrier member 44. Thus, it should be obvious that the synchronizer clutch 48 is operable to selectively connect the ring gear member 26 with any of the members of the planetary gearset 22 and the planet carrier member 34 is selectively connectible with any of the members of the planetary gearset 22.

The three-way synchronizer clutches can be comprised of a conventional one-way synchronizer and a conventional two-way synchronizer. These synchronizers are combined such that each has a commonly connected element, such as the input hub, and the output rings connected with respective gear elements. For example, the synchronizer clutch 46 can have the input hubs of both a one-way synchronizer and a two-way synchronizer connected with a transmission input shaft 58 and the output of the one-way synchronizer connected with a sun gear, and the outputs of the two-way synchronizer connected with a planet carrier and ring gear, respectively. By providing selective shifting of the synchronizer rings, a three-way synchronizer is provided. The synchronizers 46, 48, 50, 52, 54, and 56 are shown schematically. The synchronizers 46 and 50 are shown with a common member and three output members. This combination of structures, a one-way synchronizer and a two-way synchronizer are considered to be conventional devices, since those skilled in the art will recognize the structural possibilities without further description. An alternative to employing the combination of a conventional one-way synchronizer and a conventional two-way synchronizer is to utilize the multiple connection synchronizer described in U.S. Ser. No. 10/717,320 filed Nov. 19, 2003 and assigned to the assignee of this application. This patent application describes a plurality of multiple connection synchronizers that will provide the shifting capability used with the present invention.

Those skilled in the art will, of course, know that with synchronizers only one side is connectible and therefore the connection of planet carrier member 34 and ring gear member 26 are distinct and must be connected separately. This prevents the connection of both the planet carrier member 34 and ring gear member 26 with the synchronizer mechanism 50 at the same time.

The synchronizer mechanism 52 has two input members 52A and 52B and one output member 52C. The output member 52C is continuously connected with a ground member of the transmission such as a housing 62. The input member 52A is continuously connected with the sun gear member 36 and the input member 52B is continuously connected with the planet carrier member 44. When the synchronizer mechanism 52 is engaged with the sun gear member 36, that sun gear member 36 is held stationary and the same is true when the synchronizer mechanism 52 is connected with the planet carrier member 44. Essentially, the synchronizer mechanism 52 operates as a brake.

The synchronizer mechanism 54 has two input members 54A and 54B, and one output member 54C. The output member 54C is continuously connected with the transmission output shaft 18, which is thereafter connected with a conventional final drive mechanism. The input member 54A is continuously connected with the planet carrier member 44 and the input member 54B is continuously connected with the ring gear member 38.

The synchronizer mechanism 56 has two input members 56A and 56B, and one output member 56C. The output member 56C is connected with the transmission housing 62 such that the synchronizer mechanism 56 will operate as a brake. The input member 56A is continuously connected with the sun gear member 24 and the input member 56B is continuously connected with the planet carrier member 34.

Each of the synchronizers 46, 48, 50, 52, 54, and 56 also has a neutral position. In the neutral position, the synchronizer mechanisms do not provide a drive connection between any of its inputs and output members.

It will now be apparent to those skilled in the art that these synchronizers can be connected in various combinations, such as those shown in FIG. 2, to provide a plurality of drive ratios between the input shaft 58 and the output shaft 18. The input clutch 14 permits disengagement of the input shaft 58 from the engine during ratio interchanges, such that the synchronizer mechanisms can be manipulated in a conventional manner.

To establish the reverse speed ratio, the synchronizer mechanism 46 is connected between the input shaft 58 and the planet carrier member 34. The synchronizer mechanism 48 is connected between the ring gear member 26 and the synchronizer mechanism 50. The synchronizer mechanism 50 is connected with the sun gear member 36. The synchronizer mechanism 52 is connected between the planet carrier member 44 and the transmission housing 62. The synchronizer mechanism 54 is connected between the ring gear member 38 and the output shaft 18. The synchronizer mechanism 56 is connected between the sun gear member 24 and the transmission housing 62. The planetary gearset 20 provides a reduction forward speed ratio and the planetary gearset 22 provides a reverse reduction speed ratio. Therefore, the speed between the input shaft 58 and the output shaft 18 is reversed.

The chart shown in FIG. 2 provides a numerical value for the reverse speed ratio. This numerical value is determined by the ring gear/sun gear tooth ratios of the planetary gearsets 20 and 22. As seen in the chart, the ring gear/sun gear tooth ratio of planetary gearset 20 is 2.22 and the ring gear/sun gear tooth ratio of the planetary gearset 22 is 2.04.

The first forward speed ratio is established with the synchronizer mechanism 46 being connectible between the input shaft 58 and the sun gear member 42. The synchronizer mechanism 48 being connectible between the ring gear member 26 and the synchronizer mechanism 50. The synchronizer mechanism 50 being connectible between the ring gear member 26 and the ring gear member 38. The synchronizer mechanism 52 being connectible between the sun gear member 36 and the transmission housing 62. The synchronizer mechanism 54 being connectible between the planet carrier member 44 and the output shaft 18. The synchronizer mechanism 56 being connectible between the planet carrier member 34 and the transmission housing 62.

It should be noted that the numerical values of the ratios given in FIG. 2 are torque ratios (input speed divided by output speed. Thus, the output rotates slower than the input for the underdrive ratios and the output rotates faster than the input for the overdrive ratios.

It should now be apparent from the chart shown in FIG. 2 that ten forward speed ratios and one reverse speed ratio are available through various combinations of the synchronizer mechanisms 46, 48, 50, 52, 54, and 56. It will be noted that in four of the forward speed ratios, the synchronizer mechanism 52 remains in a neutral position. The synchronizer mechanism 52 is a brake mechanism, which grounds either the planet carrier member 44 or the sun gear member 36. Under each of these conditions, it will be noted that the synchronizer mechanism 50 connects with the ring gear member 38 and the synchronizer mechanism 54 also connects with the ring gear member 38. Thus, a direct drive or 1:1 ratio is provided through the planetary gearset 22 during these four forward speed ratios.

The top three-speed ratios of the planetary gear arrangement 16 are overdrive ratios, the first six of the speed ratios are underdrive ratios, and the seventh speed ratio is a 1:1 ratio. It will be noted in the seventh forward speed ratio that the ring gear member 26 is connected to both the synchronizer mechanisms 46 and 48, and the ring gear member 38 is connected with both the synchronizer mechanisms 50 and 54. The conditioning of the synchronizer mechanism 56 is not important. Under this condition, the ring gear member 26 is driven by the input shaft 58 and in turn drives the ring gear member 38, which drives the output shaft 18. Thus, a 1:1 ratio through the transmission is provided.

Those skilled in the art will note that the planetary gearset 20 can be manipulated by the synchronizer mechanisms to provide two underdrive ratios, an overdrive ratio, and a 1:1 ratio. The planetary gearset 22 can be manipulated by the synchronizer mechanisms to provide an underdrive ratio, an overdrive ratio, a reverse ratio, and a 1:1 ratio.

The planetary gearset 20 utilizes one underdrive ratio in first and third gear; the other underdrive ratio in the reverse, second, fourth, and sixth ratios; the overdrive ratio in the eighth and tenth speed ratios; and a 1:1 ratio in the fifth, seventh, and ninth speed ratios. The planetary gearset 22 is conditioned for an underdrive ratio during first, second, fifth, and eighth speed ratios. The planetary gearset 22 is conditioned for overdrive ratios in the sixth and ninth forward speed ratios. The planetary gearset 22 is conditioned for a reverse drive during the reverse speed ratio. The planetary gearset 22 is in a 1:1 condition during the third, fourth, seventh, and tenth speed ratios. Therefore, it is now apparent that each of the ratios of the planetary gearsets 20 and 22 is employed more than once as the ratio interchanges progress from the first forward speed ratio through the tenth forward speed ratio.

What is claimed is:

1. A power transmission comprising:
   an input shaft;
   an output shaft;
   a first planetary gearset having a sun gear member, a ring gear member, and a planet carrier assembly member;
   a second planetary gearset having a sun gear member, a ring gear member, and a planet carrier assembly member;
   six mechanical torque-transmitting mechanisms that are selectively engageable in a plurality of combinations of a plurality of said six mechanical torque-transmitting mechanisms to establish at least ten forward speed ratios and at least one reverse speed ratio between the input shaft and the output shaft six mechanical torque-transmitting mechanisms that are selectively engageable in a plurality of combinations to establish at least ten forward speed ratios and a least one reverse speed ratio between the input shaft and the output shaft;
   a first of said torque-transmitting mechanisms being selectively connectible between said input shaft and each of said members of said first planetary gearset;
   a second of said torque-transmitting mechanisms being selectively connectible between the ring gear member and planet carrier member of the first planetary gearset with a third of the torque-transmitting mechanisms;
   said third of said torque-transmitting mechanisms being selectively connectible with each of said members of said second planetary gearset;
   a fourth of said torque-transmitting mechanisms being selectively connectible between the planet carrier member and sun gear member of said second planetary gearset and a transmission housing;
   a fifth of said torque-transmitting mechanisms being selectively connectible between said planet carrier member and said ring gear member of said second planetary gearset and said transmission output shaft; and
   a sixth of said torque-transmitting mechanisms being selectively connectible between said sun gear member and said planet carrier member of said first planetary gearset and said transmission housing.

2. The power transmission defined in claim 1, wherein the first of said planetary gearsets is a compound planetary gearset having pairs of intermeshing pinion gears, which mesh with said ring gear member and said sun gear member, respectively.

3. The power transmission defined in claim 2, further comprising:
   said second planetary gearset being a simple planetary gearset having a single set of pinion gears rotatably mounted on said planet carrier member and disposed in meshing relationship with both said sun gear member and said ring gear member.

* * * * *